United States Patent Office 3,366,674
Patented Jan. 30, 1968

3,366,674
N - 2,6 DIMETHYLPHENYL - N - TERTIARYAMINO ALKYL-ALPHA HYDROCARBON ACETAMIDES
Suzanne Geiger, nee Berschandy, Neuilly-sur-Seine, France, assignor to Société Anonyme dite: Laboratoire Roger Bellon, Neuilly-sur-Seine, France, a French company
No Drawing. Filed Jan. 21, 1965, Ser. No. 427,167
Claims priority, application Great Britain, Jan. 23, 1964, 3,048/64
6 Claims. (Cl. 260—501.17)

ABSTRACT OF THE DISCLOSURE

Disubstituted amides are provided of the formula:

$$R-N-CO-Y$$
$$\phantom{R-N}|$$
$$\phantom{R-N-}X$$

in which R is selected from the group consisting of phenyl substituted by halogen and lower alkyl, Y is selected from the group consisting of phenyl, benzyl, diphenylmethyl, phenylhydroxymethyl, phenylacetoxymethyl, styryl and cyclohexylmethyl, and X represents $$-R_1-N\begin{matrix}R_2\\ \\R_3\end{matrix}$$

in which $R_1$ is selected from the group consisting of ethylene, trimethylene, propylene and isopropylene, and $R_2$ and $R_3$ taken separately are the same and both represent alkyl of up to 4 carbon atoms each, and taken together with the adjacent nitrogen $R_2$ and $R_3$ form a ring selected from the group consisting of pyrrolidino, piperidino, and morpholino and the acid addition salts and quaternary ammonium salts of the said amide.

---

This invention relates to amides possessing local anaesthetic properties.

The invention provides a new series of disubstituted amides which conform to the following general formula:

$$R-N-CO-Y$$
$$\phantom{R-N}|$$
$$\phantom{R-N-}X \quad\quad I$$

in which R is a phenyl radical or a phenyl radical substituted by one or more halogen atoms or lower alkyl or lower alkoxy groups, Y is an aryl, aralkyl, aralkenyl, arylhydroxyalkyl, arylacyloxyalkyl, or cycloalkylalkyl radical, and X represents a teritary amino radical:

$$-R_1-N\begin{matrix}R_2\\ \\R_3\end{matrix}$$

in which $R_1$ is a bivalent radical with 2 or 3 carbon atoms, and $R_2$ and $R_3$ are lower alkyl radicals or may form in combination a heterocyclic ring, and also the acid addition and quaternary ammonium salts of these disubstituted amides.

Preferred values of R are phenyl, p-ethoxyphenyl, m-chlorophenyl, and especially 2,6-dimethylphenyl. Y is preferably phenyl, benzyl, diphenylmethyl, phenylhydroxymethyl, phenylacetoxymethyl, styryl, or cyclohexylmethyl, and X is preferably such that either $R_2$ and $R_3$ are the same and each contain a maximum of four carbon atoms or $R_2$ and $R_3$ together with the adjacent nitrogen make up a pyrrolidino, piperidino, or morpholino ring.

The invention includes within its scope pharmaceutical compositions, for use in inducing local anaesthesia, containing one or more of the new disubstituted amides, as the base or non-toxic acid solution salts, in association with a pharmaceutical carrier.

According to a feature of the invention, the new amides are prepared by reacting a sodium, or other alkali metal, derivative of an amide of formula:

$$R-NH-CO-Y \quad\quad II$$

with an aminoalkyl halide, preferably chloride, of formula:

$$X-Halogen \quad\quad III$$

When the aminoalkyl halide of Formula III contains an asymmetrical carbon atom, the reaction gives a mixture of isomers, which differ by the position of the branch in the alkylene chain. This is because a cyclic quaternary ammonium compound is formed as an intermediate, the ring of which can open in two different ways. For example, 1-dimethylamino-2-chloropropane forms a cycle intermediate of formula:

$$\begin{matrix} & CH_3 \; CH_3 \\ & \diagdown \; \diagup \\ & N^+ \quad\quad Cl^- \\ & \diagup \; \diagdown \\ CH_2 & — & CH \\ & & | \\ & & CH_3 \end{matrix}$$

which will react with an amide of Formula II to give a mixture of isomers of the formula:

$$\begin{matrix}R-N-CO-Y & & R-N-CO-Y \\ | & & | \\ CH-CH_3 & \text{and} & CH_2 \\ | & & | \\ CH_2 & & CH-CH_3 \\ | & & | \\ N(CH_3)_2 & & N(CH_3)_2\end{matrix}$$

Generally speaking the isomers may be separated by fractional crystallisation of their hydrochlorides.

The sodium derivatives of the amide of Formula II may be prepared by reacting either powdered sodium or sodamide with the amide in an aromatic solvent such as benzene, toluene or xylene. The halide of Formula III is then reacted under reflux with the sodium derivative to form the desired amide of Formula I.

The disubstituted amides of the invention are generally viscous liquids which are distillable in vacuo at elevated temperature. The bases are purified by recrystallisation and are ordinarily isolated in yields between 50% and 80%. They can generally be converted into crystalline acid addition or quaternary ammonium salts, e.g. the methobromides by reaction with methyl bromide in solution in acetone, or the hydrazinium chlorides by reaction with chloramine in solution in chloroform.

The amides of Formula II, which are themselves new compounds and as such within the scope of the invention, may be prepared by reacting an aromatic amine of formula:

$$R-NH_2 \quad\quad IV$$

with an acyl halide, conveniently chloride, of formula:

$$Y-CO-Halogen \quad\quad V$$

It is convenient to carry out this reaction in benzene as solvent and in the presence of triethylamine as hydrochloric acid acceptor. The yield of crude product varies between 80% and 100%. The products of Formula II are purified by recrystallisation from methanol, ethanol, acetone or benzene.

An alternative way of preparing the disubstituted amides of Formula I consists in reacting an amine of formula R—NH$_2$ with a halide of formula Halogen—X, and then acylating the amine produced, of formula R—NH—X, with an acyl halide of formula Y—CO—Halogen. This method, however, is not preferred as the yields it affords are low (20–25%), but it can be used to prepare certain compounds of the invention, e.g. N-phenyl-N-(diethylaminoethyl)-2-phenyl-acetamide.

The following Examples 1 to 6 describe the preparation of certain amides of Formula II, and the results of these examples are tabulated in Table I with data relating to three other new compounds. Examples 7 to 18 describe the preparation of disubstituted amides of Formula I and the results of these examples with similar data for eight other disubstituted amides of Formula I are tabulated in Table II.

*Example 1.*—N-(2,6-dimethylphenyl)phenyl-acetamide 800 ml. of anhydrous benzene, 121 g. (1 mole) of meta-xylidine, and 101 g. (1 mole) of triethylamine are introduced into a round-bottomed flask.

The mixture is vigorously stirred and 154.5 g. (1 mole) of phenacetyl chloride are added drop-by-drop, with cooling by means of an ice bath. The temperature is 20° C. at the end of the introduction. The mixture is then heated to boiling point and maintained under reflux for 2 hours. After cooling, 1 litre of water is added. The product crystallises. It is separated, washed with benzene and dried. There are obtained 190 g. of crude product, M.P. 137°–140° C., yield=79.5%. The product is purified by recrystallisation from ethanol and then melts at 147° C.

*Example 2.*—N-(m-chlorophenyl)phenyl-acetamide 2400 ml. of anhydrous benzene, 382.5 g. (3 moles) of meta-chloraniline, and 303 g. (3 moles) of triethylamine are charged into a round-bottomed flask. The mixture is cooled with an ice bath to 12° C., and 463.5 g. (3 moles) of phenacetyl chloride are then introduced from a dropping funnel with stirring. The temperature rises to 30° C. by the end of the introduction. The mixture is stirred for 30 minutes at ambient temperature and then brought to boiling point and heated under reflux with stirring for 2 hours. After cooling, the product is run into 1500 ml. of water, and the product crystallises. It is separated, washed with water and dried. There are obtained 670 g. of crude product, M.P. 95° C., yield=91%. It is purified by recrystallisation from benzene, and then melts at 95° C.

*Example 3.*—N-(2,6-dimethylphenyl)-diphenylacetamide 200 ml. of anhydrous benzene, 60.5 g. (0.5 mole) of meta-xylidine, and 50.5 g. (0.5 mole) of triethylamine are charged into a round-bottomed flask. The mixture is vigorously stirred and a solution of 115 g. (0.5 mole) of diphenylacetyl chloride in 200 ml. of anhydrous benzene is added drop-by-drop with cooling by means of an ice bath. The temperature rises to 35° C. When the introduction is complete, stirring is continued for half an hour in an ice bath and then for half an hour at ambient temperature. The mixture is brought to boiling point and maintained under reflux for one hour, and then cooled with stirring to 15° C. The precipitate is separated, worked up into a paste in 300 ml. of cold water, re-separated and then washed with water on a filter. After drying in an oven, there are obtained 138 g. of crude product, M.P. 214° C., yield=88%. The product is purified by recrystallisation from acetone, and then melts at 215–217° C.

*Example 4.*—N-(2,6-dimethylphenyl)-2-acetoxy-2-phenyl-acetamide 300 ml. of anhydrous benzene, 60.5 g. (0.5 mole) of meta-xylidine, and 50.5 g. (0.5 mole) of triethylamine are charged into a round-bottomed flask. The mixture is cooled in an ice bath to 8° C. and 106 g. (0.5 mole) of acetylmandelic acid chloride are added with stirring. The temperature rises to 55° C. by the introduction. The mixture is stirred for one hour in an ice bath and then for 1 hour 30 minutes at ambient temperatures, and is left overnight. The next day it is heated under reflux with stirring for 1 hour 30 minutes. After cooling, 300 ml. of cold water are added with vigorous stirring. The precipitate is separated and is washed first with water and then with benzene. After drying in an oven there are obtained 137 g. of crude product, M.P. 180°–181° C., yield=92%. The crude product is purified by recrystallisation from acetone, and then has M.P. 181° C.

*Example 5.*—N-(2,6-dimethylphenyl)-2-cyclohexyl-acetamide 300 ml. of anhydrous benzene, 51 g. of meta-xylidine, and 43 g. of triethylamine are introduced into a round-bottomed flask. The mixture is cooled in an ice bath and there is slowly added with stirring a solution of 68 g. of cyclohexylacetyl chloride in 200 ml. of anhydrous benzene. The mixture is maintained for one hour in an ice bath and then at ambient temperature. A very thick suspension forms, which is heated under reflux for one hour. After cooling, the crystals are separated and worked into a paste with 1 litre of cold water, separated again, washed with benzene and then recrystallised from methanol. There are thus obtained 72 g. of product, yield=70%, M.P. 173° C.

*Example 6.*—N-(2,6-dimethylphenyl)-2-cinnamamide 400 ml. of anhydrous benzene, 112 g. of meta-xylidine, and 94 g. of triethylamine are introduced into a round-bottomed flask. The mixture is cooled in a mixture of ice and salt to −5° C. There is slowly added (in 45 minutes) with stirring a solution of 232 g. of cinnamoyl chloride in 400 ml. of benzene. The temperature is 45° C. at the end of the operation. The product is maintained for 30 more minutes in an ice bath and then at ambient temperature. The solidified mixture is made fluid by the addition of 300 ml. of benzene, and is then heated under reflux for 1 hour. After cooling 700 ml. of water are added. The product which has precipitated is separated and washed with water and then with benzene. After drying, there are obtained 242 g. of crude product which is recrystallised from acetone. 142 g. of product are thus obtained melting at 189°–191° C.

TABLE I

| Compound | Yield of crude product, percent | Solvent of recrystallization | M.P., °C. | Analysis ||||||
|---|---|---|---|---|---|---|---|---|---|
| | | | | Percent C || Percent H || Percent N ||
| | | | | Calc. | Found | Calc. | Found | Calc. | Found |
| (1) N-phenyl-phenyl-acetamide | 100 | Ethanol | 118 | | | | | | |
| (2) N-(p-ethoxyphenyl)phenyl-acetamide | 99 | ----do---- | 133 | | | | | | |
| (3) Product of Example 1 | 79 | ----do---- | 147 | 80.33 | 80.70 | 7.11 | 7.11 | 5.86 | 5.82 |
| (4) Product of Example 5 | 100 | Methanol | 173 | 78.37 | 78.58 | 9.39 | 9.34 | 5.71 | 5.50 |
| (5) N-(2,6-dimethylphenyl)-benzamide | 93 | Benzene | 166 | 80.00 | 80.24 | 6.66 | 6.67 | 6.22 | 5.88 |
| (6) Product of Example 3 | 88 | Acetone | 215–217 | 83.81 | 84.02 | 6.67 | 6.64 | 4.44 | 3.99 |
| (7) Product of Example 4 | 92 | ----do---- | 181 | 72.72 | 72.70 | 6.39 | 6.30 | 4.71 | 4.65 |
| (8) Product of Example 6 | 100 | ----do---- | 189–191 | 81.27 | 81.04 | 6.37 | 6.92 | 5.58 | 5.48 |
| (9) Product of Example 2 | 91 | Benzene | 95 | 68.43 | 68.54 | 4.89 | 4.80 | 5.70 | 5.69 |

Example 7.—N-(2,6-dimethylphenyl)-N-(2-diethyl-aminoethyl)-2-phenyl-acetamide 4.6 g. of sodium (0.2 mole) are pulverised in 60 ml. of boiling anhydrous xylene. 48 g. (0.2 mole) of the product of Example 1 are dissolved in 400 ml. of boiling anhydrous benzene, the heating is stopped, and the pulverised sodium is added after removal of the xylene. The mixture is then heated under reflux with good stirring for 24 hours. 27 g. (0.2 mole) of freshly distilled 2-diethylaminoethyl chloride are added and the mixture is heated under reflux with stirring for 5 hours. After cooling to about 50° C., 30 cc. of ethanol are added to destroy any remaining sodium. The contents are poured from the flask with stirring into 500 cc. of water. After decantation, the product is extracted from the benzene phase with hydrochloric acid (25% by volume).

The hydrochloric acid phases are combined and made alkaline with sodium hydroxide solution (about 2 N). The oil which separates is extracted with benzene. After washing with water and drying over anhydrous sodium sulphate, the solvent is driven off under the vacuum of a water jet pump. The residue is distilled twice under a vacuum of 1 mm. Hg in a nitrogen atmosphere. Finally, there are isolated 39.7 g. of a middle fraction distilling at 186°–187° C. under 1 mm. Hg, yield=58.7%, $n_D^{24}$=1.546.

The acid tartrate of this base was prepared as follows. To a solution of 0.1 mole of the base in 135 cc. of diisopropyl ether is added a solution of 0.1 mole of tartaric acid in 450 cc. of acetone. The salt is precipitated by the addition of 300 cc. of diethyl ether. The product is separated and washed with more ether. The crude tartrate is recrystallised by dissolution in absolute ethanol and reprecipitation with diisopropyl ether. It then melts at 127° C.

The methobromide of the same base was prepared as follows. To a solution of 0.05 mole of the base in 200 ml. of acetone, cooled in a mixture of ice and salt, is added 0.2 mole of methyl bromide, and the mixture is stirred in the cold for one hour. The crystals are separated and purified by recrystallisation from methyl ethyl ketone. They melt at 165° C.

The hydrazinium chloride of the base was prepared as follows. Into a solution of 0.05 mole of the base in 250 ml. of chloroform, is introduced, at normal temperature, twice the theoretical quantity of chloramine (obtained by a gas phase reaction between chlorine and ammonia). The reaction mixture is filtered to separate a little ammonium chloride. The filtrate is concentrated to dryness under the vacuum of a water jet pump. The hydrazinium chloride is purified by dissolution in chloroform and reprecipitation with petroleum ether. It melts at 185°–187° C. (dec.).

Example 8.—N-(2,6-dimethylphenyl)-N-(3-diethyl-aminopropyl)-2-phenyl-acetamide 0.1 mole of sodamide is prepared by gradually adding 2.3 g. of sodium to 200 ml. of liquid ammonia in the presence of a few ferric nitrate crystals. 23.9 g. (0.1 mole) of the product of Example 1 and 350 ml. of anhydrous toluene are added with vigorous stirring. After stirring for 30 minutes in a solid carbon dioxide bath, the product is stirred at ambient temperature until the ammonia has evaporated. It is then slowly brought to boiling point and heated under reflux for one hour. A solution of 15 g. (0.1 mole) of 1-diethylamino-3-chloropropane in 50 cc. of anhydrous toluene is added and the mixture is heated under reflux for 5 hours and left overnight. The next day 10 cc. of ethanol are added, the mixture is stirred for 10 minutes and 200 cc. of water are then added. After decantation, the product is extracted from the toluene phase with hydrochloric acid (10% by volume). The hydrochloric acid phases are combined and made alkaline with sodium hydroxide solution (about 2 N). The oil which separates is extracted with ether. After washing with saturated sodium chloride solution and drying over anhydrous sodium sulphate, the solvent is driven off under the vacuum of a water jet pump. The residue is distilled in a nitrogen atmosphere and then under a vacuum of 0.6 mm. Hg. 21 g. of middle fraction, distilling at 186°–187° C. under 0.6 mm. Hg, are isolated, a yield of 59.5%, $n_D^{20}$=1.5445.

20 g. of this base are dissolved in 50 cc. of acetone. The calculated quantity of a solution of hydrogen chloride in isopropyl alcohol having a concentration of 150 g./l. is added. The salt is precipitated by the addition of 400 cc. of diethyl ether. It is separated, washed with ether, and recrystallised from methyl ethyl ketone. The hydrochloride then melts at 124° C.

Example 9.—N-(2,6-dimethylphenyl)-N-(2-dimethyl-aminopropyl)-2-phenyl-acetamide 0.14 mole of sodamide is prepared by gradually adding 3.22 g. of sodium to 300 ml. of liquid ammonia in the presence of a few ferric nitrate crystals. A suspension of 33.5 g. (0.14 mole) of the product of Example 1 in 500 ml. of anhydrous toluene is added with vigorous stirring. The mixture is stirred until the ammonia has evaporated, slowly brought to boiling point and maintained under reflux for one hour.

A solution of 17.3 g. (0.14 mole) of 1-dimethylamino-2-chloropropane in 50 ml. of anhydrous toluene is added and the mixture is heated under reflux for 5 hours, and left overnight. The next day 10 ml. of ethanol are added, the mixture is stirred for 10 minutes and 300 ml. of water are then added. After decantation, the product is extracted from the toluene phase with hydrochloric acid (25% by volume). The hydrochloric acid phases are combined and made alkaline with 10% sodium hydroxide solution. The oil which separates is extracted with ether. After washing with a saturated sodium chloride solution and drying over anhydrous sodium sulphate, the solvent is driven off under the vacuum of a water jet pump. The residue is distilled in a nitrogen atmosphere under a vacuum of 0.9 mm. Hg. 27.4 g. of a middle fraction distilling at 173°–176° C. under 0.9 mm. Hg are isolated, a yield of 60% of once-distilled base.

The product is distilled a second time in a nitrogen atmosphere under a vacuum of 0.9 mm. Hg and 18.2 g. of a middle fraction distilling at 176°–176.5° C., under 0.9 mm. Hg, are isolated, a yield of 40%.

The base obtained as above is dissolved in acetone and the calculated quantity of a solution of hydrogen chloride in isopropyl alcohol is added. The product is separated into two hydrochloride fractions differing in solubility. Fraction I (the less soluble) melts at about 200° C., and fraction II (the more soluble) melts at 184°–190° C. Each fraction is separately purified by recrystallisation from methyl ethyl ketone and then from a mixture of alcohol and ether. Products having the following stable melting points are obtained: 228° C. in the case of fraction I; and 190° C. in the case of fraction II.

Example 10.—N-(2,6-dimethylphenyl)-N-(3-dimethyl-aminopropyl)-2-cyclohexyl-acetamide 0.2 mole of sodamide is prepared by gradually adding 4.6 g. of sodium to 400 ml. of liquid ammonia in the presence of a few ferric nitrate crystals. 49 g. (0.2 mole) of the product of Example 5 and 500 ml. of anhydrous toluene are added with vigorous stirring. The stirring is continued until the ammonia has evaporated, and the mixture is then gradually heated to boiling point, and refluxed for one hour. A solution of 26 g. (7% excess) of 1-dimethylamino-3-chloropropane in 50 ml. of anhydrous toluene is added, and the mixture is heated under reflux with stirring for 5 hours and then left overnight at ambient temperature.

The next day 10 cc. of ethanol are added and the mixture is stirred for 10 minutes, whereafter 400 cc. of water are added. After filtration the product is decanted and extracted from the toluene phase with hydrochloric acid (25% by volume). The hydrochloric acid phase is made alkaline with sodium hydroxide solution, and the oil which separates is extracted with toluene. After washing with water and drying over anhydrous sodium sulphate, the solvent is driven off under the vacuum of a water jet pump. The residue is distilled under a nitrogen atmosphere and under a vacuum of 1.5 mm. Hg. 40.3 g. of a middle fraction, distilling at 192°–193° C. under 1.5 mm. Hg, are isolated, a yield of 61%, $n_D^{20}=1.5230$.

7 g. of the base are dissolved in 30 cc. of acetone, and the calculated quantity of a solution of hydrogen chloride in isopropyl alcohol having a concentration of 150 g./l. is added. The hydrochloride crystallises on cooling in an ice bath, and it is separated and washed with acetone. The crude hydrochloride is purified by recrystallisation from methyl ethyl ketone, and then melts at 213° C.

*Example 11.*—N-(2,6-dimethylphenyl)-N-(3-dimethylaminopropyl)-cinnamamide 1 litre of anhydrous xylene, 50.2 g. (0.2 mole) of the product of Example 6 and 4.6 g. (0.2 mole) of sodium are introduced into a round-bottomed flask, and the mixture is boiled and vigorously stirred to pulverise the sodium. After boiling for 2 hours, the sodium disappears. The product is again heated under reflux for 1 hour and 25 g. (3% excess) of 1-dimethylamino-3-chloropropane are added. The mixture is heated under reflux with stirring for 5 hours and left overnight at ambient temperature. The next day 15 ml. of methanol are added and the contents of the flask are stirred and then poured into 1 litre of water with stirring. After decantation, the product is extracted from the xylene phase with hydrochloric acid (25%). The hydrochloric acid phase is made alkaline with sodium hydroxide solution. A yellow oil separates and is extracted with benzene. The extract is washed with water and dried over anhydrous sodium sulphate. The solvent is then driven off under the vacuum of a water jet pump. The residue is distilled in a nitrogen atmosphere under a vacuum of 0.06–0.07 mm. Hg. There are isolated 46 g. of product distilling between 170° and 180° C. under 0.06–0.07 mm. Hg. The distilled base solidifies and is purified by recrystallisation from isopropyl ether. It forms white crystals melting at 76° C.

10 g. of the base are dissolved in 100 cc. of acetone, and the calculated quantity of a solution of hydrogen chloride in isopropyl alcohol having a concentration of 140 g./l. is added, followed by 20 cc. of isopropyl ether. After separation the product is washed with ether. The crude hydrochloride is recrystallised from acetone, and then melts at 226°–227° C.

*Example 12.*—N-(2,6-dimethylphenyl)-N-(3-dimethylaminopropyl)-2,2-diphenyl-acetamide Into a 1 litre round-bottomed flask are introduced 300 ml. of xylene, 27 g. of the product of Example 3, and 1.98 g. of sodium. The mixture is heated under reflux for 3½ hours with stirring. The sodium has then disappeared. 13 g. of 1-dimethylamino-3-chloropropane and 50 ml. of xylene are added and the mixture is heated under reflux for 4 hours and poured into 500 ml. of water. The xylene phase is decanted and treated with 25% hydrochloric acid. A small quantity of an oily substance is formed together with crystals, which are separated. The crystals are dissolved in water and the solution is made alkaline with sodium hydroxide and extracted with ether. The ethereal phases are combined, washed with water, and dried over anhydrous sodium sulphate. The ether is then driven off and there are obtained 10.8 g. of a thick yellowish oil, a yield of 31.4%.

10.8 g. of this base are dissolved in 200 ml. of diisopropyl ether and treated with a solution of hydrochloric acid in isopropyl alcohol. 12 g. of crude hydrochloride are obtained, which is purified by recrystallisation from 100 ml. of ethanol to give 7.8 g. of pure hydrochloride, M.P. 234° C., a yield of 66%.

*Example 13.*—N-(2,6-dimethylphenyl)-N-(3-dimethylaminopropyl)-2-acetoxy-2-phenyl-acetamide Into a round-bottomed flask containing 500 ml. of xylene are introduced 37 g. of the product of Example 4 and 2.54 g. of sodium. The mixture is heated under reflux for 3¼ hours with stirring. There are then added 16 g. of 3-dimethylamino-1-chloropropane, the mixture is heated under reflux for 4¼ hours with continued stirring and then poured into iced water. The xylene phase is decanted and treated with 3× 100 ml. of 25% hydrochloric acid. The aqueous phase is separated, washed with benzene and made alkaline in the cold with sodium hydroxide. An oil separates, which is extracted with benzene.

The benzene phase is washed with a saturated solution of sodium chloride and then dried over anhydrous sodium sulphate. The solvent is driven off and there are thus obtained 32 g. of a very thick oil, a yield of 67.5%.

This oil may be deacetylated as follows. It is dissolved in 180 ml. of ethanol. There are added 45 ml. of 2 N sodium hydroxide solution and the mixture is stirred and heated for half an hour at 50° C. An oil separates, which is extracted with 4× 100 ml. of benzene. After drying over anhydrous sodium sulphate, the solvent is driven off in vacuo, and there are obtained 28 g. of a thick oil and 2.6 g. of crystals of the deacetylated product melting at about 104°–118° C. These crystals are purified by recrystallisation from 10 ml. of isopropyl ether and 1.85 g. of crystalline N-(2,6-dimethylphenyl)-N-(3-dimethylaminopropyl)-mandelamide, M.P. 102° C., is obtained.

The 28 g. of oil are distilled under reduced pressure in a nitrogen atmosphere. The following fractions are thus obtained: first fraction $F_1$, 1.91 g.; fraction $F_2$, 9.06 g., B.P./0.2 mm. Hg 175°–183° C.; fraction $F_3$, 2.09 g., B.P./0.2 mm. Hg 191°–196° C. Fractions $F_2$ and $F_3$ are combined and give, after purification by recrystallisation, a product melting at 103° C. identical with that already described.

3.6 g. of this base are dissolved in 100 ml. of acetone, 1.6 ml. of tartaric acid in solution in 100 ml. of acetone is added, the mixture is stirred and 100 ml. of ether are then added. A gummy mass forms, which is separated and triturated with ether. There are thus obtained 3.9 g. of crude acid tartrate, which is recrystallised from 700 ml. of ethyl acetate, to give 2 g. of pure product.

*Example 14.*—N-(m-chlorophenyl)-N-(3-dimethylaminopropyl)-2-phenyl-acetamide 0.2 mole of sodamide is prepared by gradually adding 4.6 g. of sodium to 400 ml. of liquid ammonia in the presence of a few crystals of ferric nitrate. 500 ml. of toluene containing in solution 0.2 mole of the product of Example 2 are added in 20 to 25 minutes. After the removal of the ammonia, the product is heated under reflux for 1 hour. 25 g. of 1-dimethylamino-3-chloropropane (3% excess) in solution in 50 ml. of anhydrous toluene are then added. This addition, which takes place slowly with stirring, is followed by heating under reflux for 5½ hours. After cooling, the mass is run into water, and after decantation, the toluene phase is extracted with 25% hydrochloric acid. The aqueous phase, washed with benzene, is made alkaline and then extracted with benzene. The benzene phase is then washed with water, dried over sodium sulphate and distilled in a high vacuum. A yellowish liquid is obtained, B.P./0.04 mm. Hg=173° C., in a yield of 27.6%.

This base is dissolved in acetone, and a 5% excess of HCl in isopropyl alcohol is added. The hydrochloride crystallises on cooling to 5° C. It is re-dissolved by heating under reflux in acetone. The crystals obtained after cooling melt at 180° C.

*Example 15.—N-(2,6-dimethylphenyl)-N-(2-dimethylaminopropyl)-2-cyclohexyl-acetamide*

0.2 mole of sodamide are made by gradually adding 4.6 g. of sodium to 400 ml. of liquid ammonia in the presence of a few ferric nitrate crystals. 49 g. (0.02 mole) of the product of Example 5 and 500 ml. of anhydrous toluene are added with vigorous stirring. When the ammonia has been driven off, the product is gradually brought to boiling point and heatted under reflux for 1 hour. A slight excess of 1-dimethylamino-2-chloropropane in solution in anhydrous toluene is added, and the mixture is then heated under reflux for 4 hours. After cooling, the product is taken up in a small quantity of ethanol and is then run into water. The toluene layer is separated and the product is extracted from it with hydrochloric acid (25% by volume). The extract is washed with benzene and made alkaline with sodium hydroxide solution. An oil separates, which is extracted with benzene. The benzene solution is washed and dried over anhydrous sodium sulphate and the solvent is driven off in vacuo. The oily residue is distilled in a nitrogen atmosphere under a vacuum of 0.2 mm. Hg. After elimination of 1.6 g. of a first fraction, boiling at a temperature below 150° C., a total of 42.4 g. of product is obtained in two fractions. This product is fractionated again in vacuo (0.2 mm. Hg) in a nitrogen atmosphere, and 32.2 g. of final product are obtained, B.P./0.02 mm. Hg=158° C., $n_D^{20}$=1.524.

20 g. of this base are dissolved in 200 ml. of ether. A solution of hydrochloric acid in ether is added drop-by-drop. A very dense white precipitate forms, which is separated, washed with ether and dried in vacuo. It weighs 23.5 g., a yield of 84.8%.

The product is dissolved in 150 ml. of boiling acetone. The solution is filtered and then left overnight in the refrigerator. By their difference in solubility, two hydrochloride fractions are separated: fraction I (the less soluble), M.P. 188°–189° C., 11.7 g.; and fraction II (the more soluble), M.P. about 170° C., 6.2 g. Fraction I, when recrystallised from 120 ml. of boiling acetone, gives 5.7 g. of white crystals, M.P. 189°–190° C. Fraction II, when recrystallised from 60 ml. of boiling ethyl acetate, gives 2.4 g. of white crystals, M.P. 185° C.

*Example 16.—N-(2,6-dimethylphenyl)-N-(3-diethylaminopropyl-)2-cyclohexyl-acetamide*

This compound is prepared using the method described in Example 10 for the preparation of the corresponding dimethylamino derivative. It is a colourless oil which has a boiling point of 195°–198° C./0.05 mm. Hg, and is obtained in a yield of 62%.

This base (10 g.) is dissolved in 50 ml. of ether. A solution of hydrogen chloride in ether is added drop-by-drop, and a voluminous white precipitate forms, which is seperated, washed with ether, dried in vacuo and crystallised from ethyl acetate. There are obtained 9.1 g. of a product melting at 156° C. The hydrochloride is purified by recrystallisation. For this purpose it is dissolved in boiling ethanol, and the solution is filtered and cooled and ether is added. The precipitated hydrochloride is separated, washed with ether and dried in an oven. It melts at 156°–157° C.

*Example 17.—N-(2,6-dimethylphenyl)-N-(2-dimethylaminopropyl)cinnamamide*

Sodium (6.9 g., 0.3 mol) is pulverised in 1500 ml. of boiling anhydrous xylene, and 75.3 g. (0.3 mol) of N-(2,6-dimethylphenyl)-cinnamamide is added and the mixture is refluxed with agitation for 3 hours. Heating is then discontinued, and 40 g. (a 10% excess) of freshly distilled 1-dimethylamino-2-chloropropane is added drop by drop. The mixture is refluxed with agitation for a further 5 hours and then allowed to stand overnight. 15 ml. of ethanol are then added, the mixture is stirred, and 1300 ml. of water are then run into the reaction mixture. The xylene layer is then separated and extracted with 25% hydrochloric acid. The hydrochloric acid extract is made alkaline with sodium hydroxide solution and the oil which separates is extracted with benzene. The benzene solution is then washed with water, dried over anhydrous sodium sulphate, and the benzene removed. The residue is distilled twice at a low pressure in an atmosphere of nitrogen. A yield of 56.5% of the desired product is obtained, B.P. 172°–174° C./0.1 mm. Hg. It solidifies on cooling and then melts at 95–100° C. By fractional crystallisation from acetone, the product may be separated into two constituents, of which the less soluble melts at 125° C. The more soluble may be isolated by evaporation of the mother liquors.

9 g. of the base obtained as described above, and recrystallized from acetone, are dissolved in a mixture of 100 ml. of ether and 50 ml. of acetone. A solution of hydrogen chloride in ether is then added, and the hydrochloride which crystallises out is separated and washed with ether. This crude hydrochloride is recrystallised from acetone and then melts at 205° C. (inst.).

*Example 18.—N-(2,6-dimethylphenyl)-N-(3-diethylaminopropyl)cinnamamide*

Sodium (4.6 g., 0.2 mol) is powdered in 1 litre of boiling anhydrous xylene, 50.2 g. (0.2 mol) of N-(2,6-dimethylphenyl)-cinnamamide are added, and the mixture is refluxed with agitation for 3 hours. Heating is discontinued and 33 g. (a 10% excess) of freshly distilled 1-diethylamino-3-chloropropane are added drop by drop. The mixture is refluxed with agitation for 5 hours and then allowed to stand overnight. 15 ml. of ethanol are added, the mixture is agitated, and 1 litre of water is then run in. The xylene layer is separated and extracted with 25% hydrochloric acid. The hydrochloric acid extract is made alkaline with sodium hydroxide solution and the oil which separates is extracted with benzene. The benzene extract is washed with water, dried over anhydrous sodium sulphate, and the benzene is distilled off in vacuo. The residue is distilled twice at a low pressure in an atmosphere of nitrogen, and a fraction boiling at 193–195° C./0.1 mm. Hg is obtained in a yield of 52.2%.

20 g. of the oily base obtained as described above are dissolved in a 100 ml. of ether, and a solution of hydrogen chloride in ether is added. The hydrochloride crystallises out, and is separated and washed with ether. It is then recrystallised from acetone, and melts at about 120° C. (dec.). Titration with Karl Fischer reagent shows that it crystallises with one molecule of water of crystallisation.

Proceeding in the manner described in the foregoing examples, the following di-substituted amides may be prepared:

N-phenyl-N-(2-diethylaminoethyl)-2-phenyl-acetamide;
N-(p-ethoxyphenyl)-N-2-diethylaminoethyl-2-phenyl-acetamide;
N-(2,6-dimethylphenyl)-N-(2-morpholinoethyl)-2-phenyl-acetamide;
N-(2,6-dimethylphenyl)-N-(2-piperidinoethyl)-2-phenyl-acetamide;
N-(2,6-dimethylphenyl)-N-(2-dibutylaminoethyl)-2-phenyl-acetamide;
N-(2,6-dimethylphenyl)-N-(2-pyrrolidinoethyl)-2-phenyl-acetamide;
N-(2,6-dimethylphenyl)-N-(3-dimethylaminopropyl)-2-phenyl-acetamide;
and N-(2,6-dimethylphenyl)-N-(3-dimethylaminopropyl)-benzamide.

TABLE II

| Compound | Sodioderivative prepared with— | B.P. of base, °C./mm. Hg | nD of base | M.P. of base, °C. | Salt prepared | M.P. of salt, °C. | Analysis | | | | | | | |
|---|---|---|---|---|---|---|---|---|---|---|---|---|---|---|
| | | | | | | | Percent C | | Percent H | | Percent N | | Percent Cl or Br | |
| | | | | | | | Calc. | Found | Calc. | Found | Calc. | Found | Calc. | Found |
| (12) Product of Example 7 | Na-benzene | 186–187/1 mm | nD²⁴=1.546 | | Acid tartrate methobromide hydrazinium chloride | 127 / 165 / 185-7 (dec.) / 210 | 63.93 / 63.74 / 67.78 | 63.88 / 63.95 / 67.40 | 7.27 / 7.62 / 8.21 | 7.64 / 7.51 / 8.37 | 5.73 / 6.47 / 10.78 | 5.65 / 6.34 / 10.80 | 18.47 / 8.12 | 18.24 / 9.18 |
| (13) N-(2,6-dimethylphenyl)-N-(2-morpholinoethyl)-2-phenylacetamide | Na-toluene | 212–216/0.7 mm | nD²¹=1.563 | | Hydrochloride | 180 (dec.) | 68.00 | 68.27 | 7.46 | 7.72 | 7.21 | 7.17 | 9.14 | 9.17 |
| (14) N-(2,6-dimethylphenyl)-N-(2-piperidinoethyl)-2-phenylacetamide | NaNH₂ toluene | 171–177/0.4–0.5 mm | nD²⁰=1.5615 | | do | 180 (dec.) | 71.50 | 71.36 | 8.04 | 8.11 | 7.24 | 7.16 | 9.18 | 9.18 |
| (15) N-(2,6-dimethylphenyl)-N-(diamylaminoethyl)-2-phenyl-acetamide | do | 199–202/0.7 mm | nD²⁴=1.5300 | | Methobromide² | 176 | 66.26 | 66.27 | 8.38 | 8.20 | 5.72 | 5.50 | 16.36 | 16.40 |
| (16) N-(2,6-dimethylphenyl)-N-(2-pyrrolidinoethyl)-2-phenylacetamide | do | 186–188/0.3 mm | nD²⁰=1.563 | | Hydrochloride | 187 | 71.00 | 70.95 | 7.73 | 7.81 | 7.52 | 7.49 | 9.53 | 9.42 |
| (17) Product of Example 8 | do | 186–187/0.6 mm / 193–194/1.3 mm | nD²⁰=1.5445 / nD²⁰=1.5515 | | do | 124 / 170 (dec.) | 71.04 / 70.00 | 70.97 / 70.06 | 8.49 / 8.03 | 8.50 / 8.03 | 7.21 / 7.77 | 7.35 / 7.80 | 9.14 / 9.85 | 9.18 / 9.78 |
| (18) N-(2,6-dimethylphenyl)-N-(3-dimethylaminopropyl)-2-phenylacetamide | do | 176–6.5/0.9–1 mm | nD²⁰=1.552 | | do { I / II | 228 / 190 | 69.90 / 69.90 | 69.71 / 69.68 | 8.04 / 8.04 | 7.80 / 8.30 | 7.76 / 7.76 | 7.65 / 7.50 | 9.85 / 9.85 | 9.74 / 9.77 |
| (19) Product of Example 9 | do | 192–198/1.5 mm | nD²⁰=1.5230 | | do | 213 / 180 (dec.) | 68.76 / 69.26 | 68.46 / 69.25 | 9.55 / 7.79 | 9.47 / 7.83 | 7.64 / 8.08 | 7.61 / 7.77 | 9.68 / 10.25 | 9.64 / 9.92 |
| (20) Product of Example 10 | do | | | ⁴100 | do | 234 | 74.22 | 74.28 | 7.56 | 7.73 | 6.41 | 6.25 | 8.13 | 8.06 |
| (21) N-(2,6-dimethylphenyl)-N-(3-dimethylaminopropyl)-benzamide | Na xylene | (⁵) | | ⁶103 / ⁷76 | Acid tartrate / Hydrochloride | 102 / 226–227 | | | | | | | | |
| (22) Product of Example 11 | do | 170–180/0.06–0.07 mm.¹ | | | do | 180 | 62.12 | 62.16 | 6.54 | 6.52 | 7.63 | 7.64 | 19.35 | 19.33 |
| (23) Product of Example 12 | NaNH₂ xylene | 172–173/0.04 mm. | | | do ³ | 189–190 | 68.76 | 68.60 | 9.55 | 9.70 | 7.66 | 7.50 | 9.67 | 9.72 |
| (24) Product of Example 13 | NaNH₂ toluene | 158/0.2 mm.¹ | | | do ³ | 185 | 68.76 | 68.89 | 9.55 | 9.69 | 7.66 | 7.76 | 9.67 | 9.55 |
| (25) Product of Example 14 | NaNH₂ toluene | | nD²⁰=1.524 | | do { I / II | 156–157 | 69.96 | 69.86 | 9.89 | 9.93 | 7.09 | 7.02 | 8.99 | 9.09 |
| (26) Product of Example 15 | NaNH₂ toluene | 195–198/0.05 mm.¹ | | ⁸95–100 | Hydrochloride | ⁹205 | 70.88 | 71.24 | 7.79 | 7.95 | 7.51 | 7.43 | 9.53 | 9.55 |
| (27) Product of Example 16 | Na xylene | 172–174/0.1 mm.¹ | | | do | 120 (dec.) | 63.82 | 63.09 | 8.36 | 8.32 | 6.69 | 6.68 | 8.48 | 8.44 |
| (28) Product of Example 17 | do | 193–195/0.1 mm.¹ | | | Hydrochloride with 1 molecule of H₂O | | | | | | | | | |
| (29) Product of Example 18 | | | | | | | | | | | | | | |

In Table II, a number of references have been inserted, the significance of which is as follows:

[1] The analyses of compounds 15, 23, 24, 26, 27, and 28 as the bases were as follows:

| Compound | Percent C | | Percent H | | Percent N | |
|---|---|---|---|---|---|---|
| | Calc. | Found | Calc. | Found | Calc. | Found |
| 15 | 79.20 | 79.15 | 9.64 | 9.59 | 7.10 | 7.64 |
| 23 | 74.11 | 73.97 | 8.24 | 8.23 | 8.24 | 8.03 |
| 24 | 78.57 | 78.74 | 8.33 | 8.50 | 8.33 | 8.13 |
| 26 | 76.36 | 76.75 | 10.30 | 10.43 | 8.48 | 8.55 |
| 27 | 78.57 | 78.38 | 8.33 | 8.41 | 8.33 | 8.61 |
| 28 | | | | | 7.69 | 7.99 |

[2] It was not possible to obtain a crystalline hydrochloride or tartrate.
[3] The two isomeric hydrochlorides 1 and 2 have side chains X of the formulae:

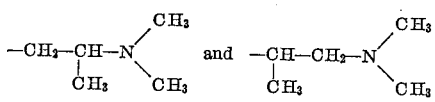

or vice versa

[4] The base was purified by recrystallisation from ethanol.
[5] The reaction was carried out on the acetylated product. The crude base was deacetylated.
[6] The base was purified by recrystallisation from diisopropyl ether.
[7] The once-distilled base was re-purified by recrystallisation from diisopropyl ether.
[8] This is the melting point of the unseparated mixture of isomeric bases. The less soluble base melts at 125° C.
[9] For the mixture of isomeric hydrochlorides.

The local anaesthetic activity of the amides of Formula I was qualitatively and quantitatively determined, and the results are given in the following Table III. The compounds were tested, without separation of the isomer mixtures except where indicated, as the crystalline tartrates or hydrochlorides, which are water-soluble and give solutions having pH values between 4 and 7.

ACUTE TOXICITY

The acute toxicity was determined on male mice weighing from 18 to 22 g., the compound under test being administered subcutaneously. The $LD_{50}$ values were determined in accordance with the method of Karber and Behrens (Arch. F. Exp. Path. U. Pharm., 1935, 177, 379) and expressed in mg. of salt per kg. of mouse are given in Table III.

LOCAL ANAESTHETIC ACTIVITY

The local anaesthetic activity was determined on the rabbit's cornea by the method of Regnier (Thesis for a Doctorate of Medicine, Paris 1929). Batches of 4 rabbits were used. Each compound was tested on a batch of 4 rabbits with comparative cross testing with a reference anaesthetic or with a second new compound. The results are shown in Table III (indicated by "Surface").

The anaesthesia caused by infiltration was tested by the intradermal button method on the back of the guinea pig, the method of Bulbring and Wajda (J. Pharm. (1945), 85, 78), a known second compound or a reference anaesthetic being used as comparison. The results are shown in Table III (indicated by "infiltration"). The compound members are the same as those occurring in the first column of Table II.

The results given in the table show that, of the compounds tested, those of Examples 11, 15 and 16 (compounds 24, 26 and 27) are the most active.

TABLE III.—ACUTE TOXICITY AND SURFACE AND INFILTRATION ANAESTHETIC ACTIVITY

| Compound No. | $LD_{50}$ subcutaneously mouse, mg./kg. | Activity as Compared with— | | |
|---|---|---|---|---|
| | | Cocaine (Surface) | Lidocaine (infiltration) | Procaine (infiltration) |
| 12 | [1] 165 | <1 | >1 | |
| 14 | 65 | About 1 | >1 | |
| 16 | 95 | About 1 | >1 | |
| 18 | 250 | About 1 | >1 | |
| 17 | 190 | About 1 | >1 | |
| 19 [2] | 310 | About 1 | About 1 | |
| 19 [3] | 200 | About 1 | About 1 | |
| 20 | 710 | 10.5 | >1 | 2.6 |
| 21 | 210 | 1.1 | >1 | 2.6 |
| 22 | 210 | 2.6 | About 2 | 4.6 |
| 23 | 830 | 0.9 | <1 | 1.1 |
| 24 | 370 | 13.2 | About 40 | About 110 |
| 25 | 895 | 1.5 | | 6 |
| 26 [2] | 2,500 | 6 | | 2 |
| 26 [3] | 435 | 9 | 10 | 28 |
| 27 | 335 | 10 | 10 | 30 |
| 28 | 155 | 14 | About 2.5 | 8 |
| 29 | <100 | | About 6 | About 16 |

[1] 100 in base.
[2] One isomer.
[3] The other isomer.
[4] Ratio = $\frac{\text{activity of compound of the invention}}{\text{activity of reference compound}}$

I claim:
1. N-(2,6-dimethylphenyl) - N - (3-dimethylaminopropyl)-cinnamamide or its acid addition salts.
2. N-(2,6-dimethylphenyl) - N - (2-dimethylaminopropyl)-2-cyclohexyl-acetamide or its acid addition salts.
3. N-(2,6-dimethylphenyl) - N - (3-diethylaminopropyl)-2-cyclohexyl-acetamide or its acid addition salts.
4. N-(2,6-dimethylphenyl) - N - (2-dimethylaminopropyl)cinnamamide or its acid addition salts.
5. N-(2,6-dimethylphenyl) - N - (3-diethylaminopropyl)cinnamamide or its acid addition salts.
6. A disubstituted amide of formula

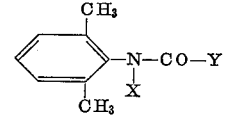

wherein X is

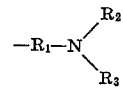

in which $R_1$ is alkylene of 2 or 3 carbon atoms, and $R_2$ and $R_3$ are the same alkyl group of up to 4 carbon atoms, or taken together with the adjacent nitrogen, form a ring which is selected from the group consisting of pyrrolidino, piperidino, and morpholino, and Y is diphenylmethyl, styryl, or cyclohexylmethyl, acid addition or quaternary ammonium salts thereof.

References Cited

Larizza et al.: Gazz. Chim. Ital., vol. 89, pp. 2402–20, only pages 2412 and 2414 are relied on (1959).

ALEX MAZEL, *Primary Examiner.*

NICHOLAS S. RIZZO, *Examiner.*

J. TOVAR, *Assistant Examiner.*